Jan. 30, 1923.
C. KUSOLD.
MILLING MACHINE.
FILED FEB. 12, 1921.
1,443,899.
3 SHEETS—SHEET 1.
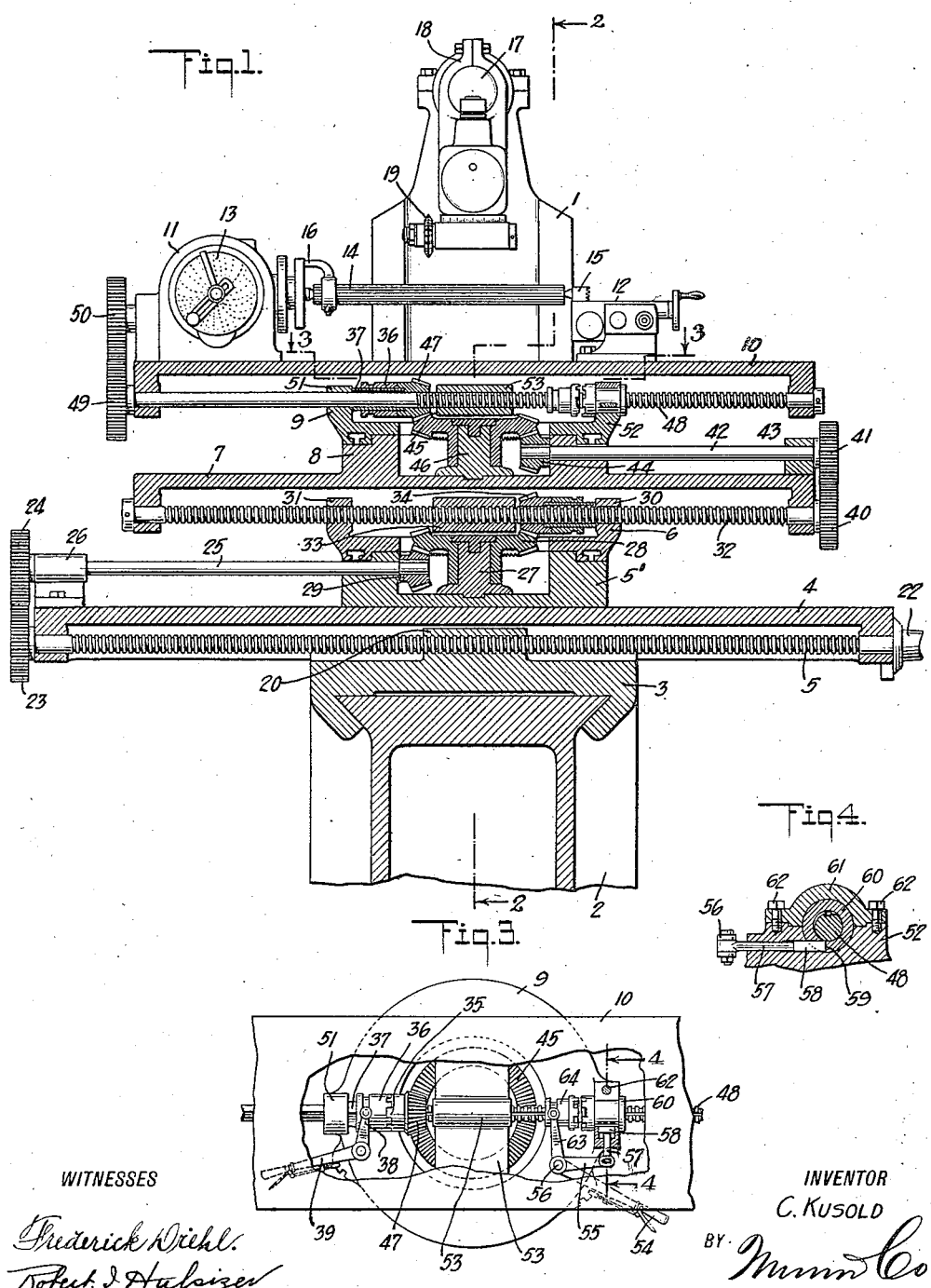
WITNESSES
Frederick Diehl.
Robert I. Halsizer
INVENTOR
C. KUSOLD
BY Munn & Co
ATTORNEYS Jan. 30, 1923.
C. KUSOLD.
MILLING MACHINE.
FILED FEB. 12, 1921.
1,443,899.
3 SHEETS—SHEET 2.
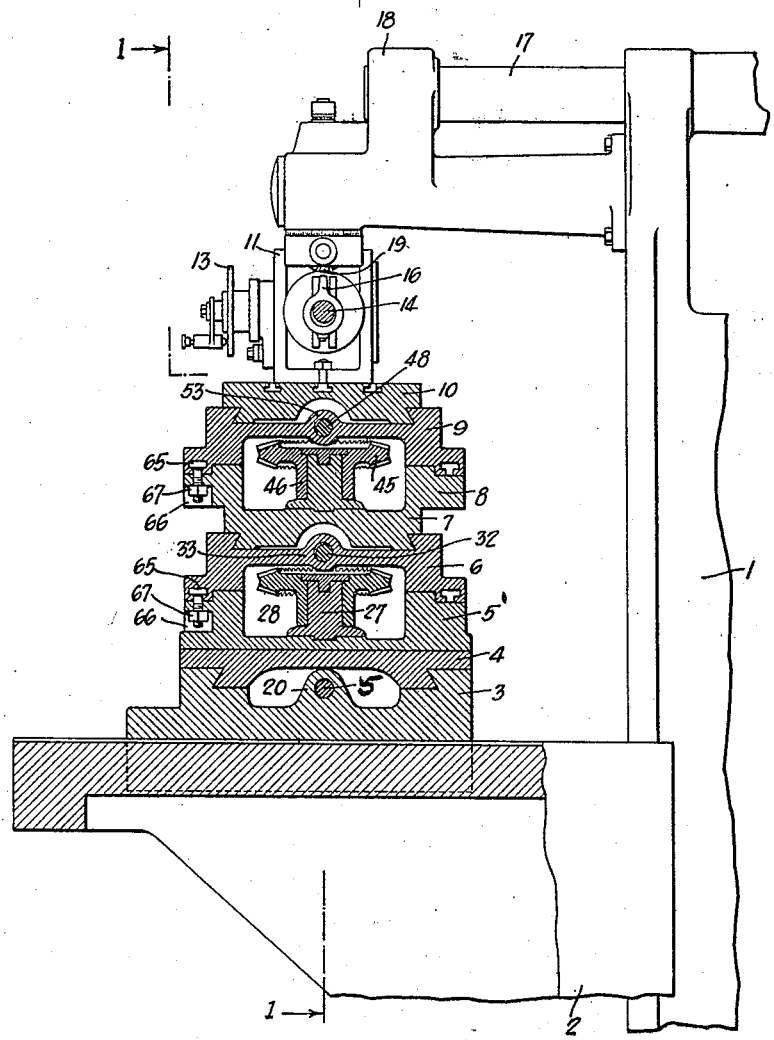
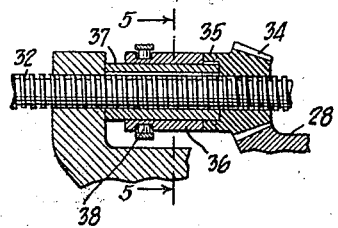
WITNESSES
INVENTOR
C. KUSOLD
BY
ATTORNEYS

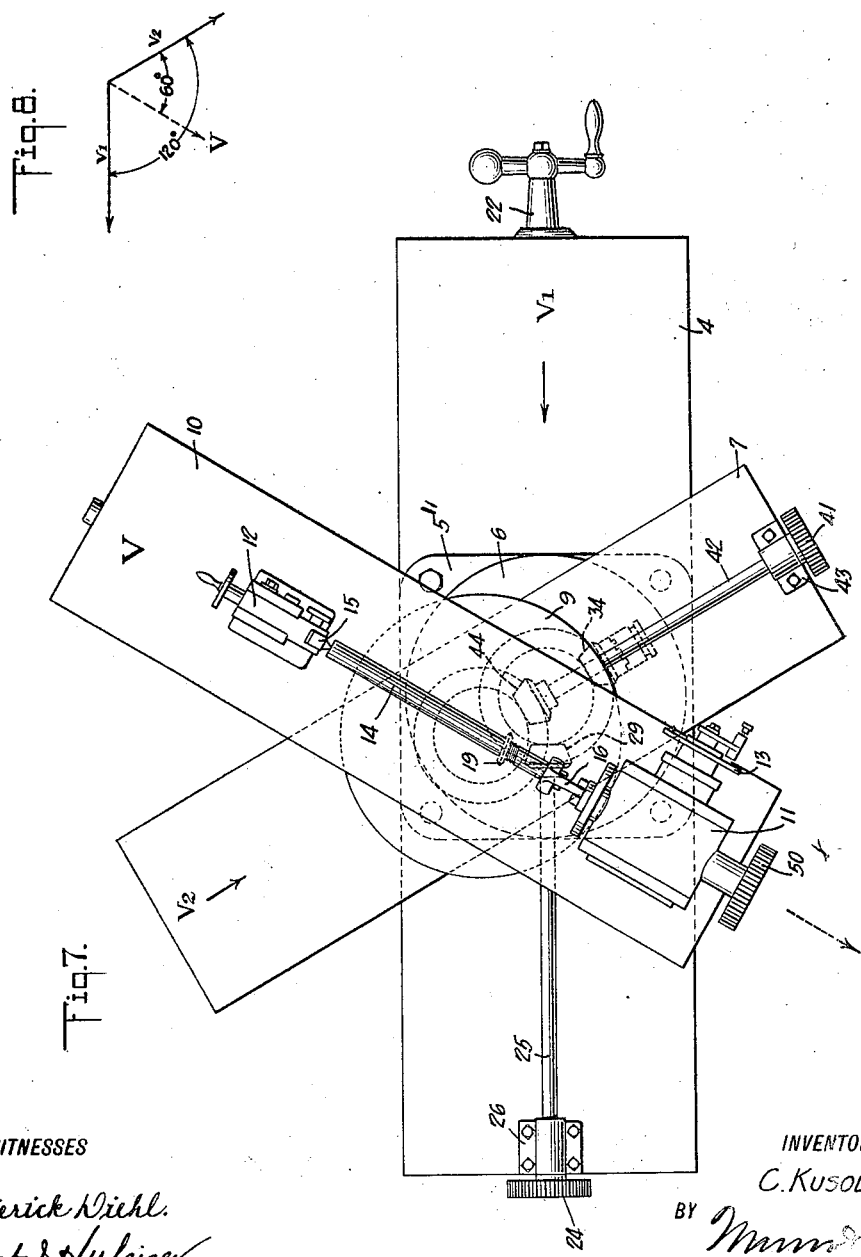

Patented Jan. 30, 1923.

1,443,899

UNITED STATES PATENT OFFICE.

CHARLES KUSOLD, OF NEW YORK, N. Y.

MILLING MACHINE.

Application filed February 12, 1921. Serial No. 444,450.

*To all whom it may concern:*

Be it known that I, CHARLES KUSOLD, a citizen of Jugo-Slavia, and a resident of the city of New York, borough of Manhattan, in the county and State of New York, have invented a new and Improved Milling Machine, of which the following is a full, clear, and exact description.

This invention relates to metal-working machines, and has particular reference to a new and improved attachment for those types of the above-mentioned machines which are known as milling machines.

An object of the invention is to provide a device which can be attached to a milling or similar machine whereby threads may be produced by a very simple adjustment of the parts of the device without the necessity for changing the parts or changing gears to produce different threads or spirals as is now the case.

Another object of the invention is to provide a device, comprising a minimum number of parts, in the form of an attachment to a milling machine, or other machine, whereby by setting the various parts initially, in accordance with a formula, in a definite manner to each other the required thread or groove may be produced on the metal or other work to be treated.

A further object resides in the particular construction and arrangement of parts hereinafter described and claimed and shown in the accompanying drawings.

In general, my invention comprises the provision of an attachment which can be very simply and readily applied to a milling or similar machine with a minimum disturbance of the standard and usual construction thereof, so that a wide range of threads of varying pitches, or spiral grooves, or teeth forms, can be produced on any desired metal stock by a simple setting of the parts relative to each other at the desired angle, and eliminates the necessity for changing gears. Usually to cut threads on metal the work support is caused to travel a definite distance to each revolution of the work on the support. If a different thread is required, the work support must be driven a different distance in one revolution. This variation in the linear speed of the work support, since it is taken in the same direction and along the same line, requires the use of another set of driving gears. Because of the limitations in the production of standard gears it is impossible to produce threads of certain pitches since it is impossible to find gears which will give the proper ratio between the movement of the carriage and the revolution of the work on the carriage.

My invention more particularly relates, therefore, to a plurality of moving or slidable tables which can be moved at predetermined speeds with respect to a common support and each other and in different relative directions. One of these slidable supports or tables is adapted to carry the work being treated, and the resultant movement of the work, due to the resultant action of the relatively moving tables, is in accordance with the well-known graphical principle concerning the combination of vectors.

More specifically, I provide a work support between which and the ordinary feed table of a milling machine there is interposed a slidable and angularly adjustable platform on which the work support is mounted. This intermediate support or feed table can be angularly adjusted with respect both to the work support and to the ordinary sliding carriage or feed table of a milling machine. By being able to adjust the intermediate carriage and the work support with respect to each other and the ordinary feed table, and knowing their definite speeds in a given unit of time, the resultant movement of the work can be varied to produce the desired movement in a unit of time of the work in accordance with this vectorial combination above mentioned and without changing the gears of the machine. In this way, assuming the work is being rotated during its linear movement as a whole, threads, spiral grooves, and other grooves, can be produced on the work and of varying pitch, in accordance with the setting of the various slides.

It is well within the spirit of the invention that gear teeth and other uniform curves, either on round bodies such as rods, or on flat surfaces, may be produced by the application of this principle without departing from the spirit of the invention set forth herein.

The invention is shown in the drawings, of which—

Figure 1 is a longitudinal vertical section taken on the line 1—1 of Figure 2;

Figure 2 is a transverse vertical section taken on the line 2—2 of Figure 1;

Figure 3 is a horizontal section taken on the line 3—3 of Figure 1;

Figure 4 is a vertical transverse section taken on the line 4—4 of Figure 3;

Figure 5 is a section taken on the line 5—5 of Figure 6;

Figure 6 is an enlarged detail view of one of the driving gear adjustments;

Figure 7 is a plan view of the machine with the attachment applied and set in a desired position; and Figure 8 is a diagram illustrating the principle of which this invention is an application.

As shown in the drawings, the preferred form of my invention is embodied as a milling machine adapted to cut threads, spiral grooves, gear teeth and similar forms, and which comprises a column 1 to which a knee 2 is adjustably connected in a well-known manner. On the knee 2 a saddle 3 is adjustably supported, the saddle being adapted to be moved forward or backward along the upper surface of the knee, as desired, toward or away from the column 1. On the upper face of the saddle 3 the usual screw-operated carriage 4 is mounted and adapted to be driven by the screw 5 in a manner well known with this type of machine.

Ordinarily the work is supported on the carriage 4 and moves backward and forward with the carriage past the cutting device or tool. Sometimes the work, during this linear movement, is rotated and other times not. In accordance, however, with my invention, I have added certain other features as attachments to the milling machine whereby the objects previously mentioned are attained. Therefore, in accordance with this addition, I have provided a base portion 5′ which can be suitably connected or bolted to the upper surface of the sliding carriage 4. This base is adapted to receive on its upper surface an adjustable base member 6 which can be angularly adjusted with respect to the base member 5′ and located in any desired position relative thereto. This adjustable base member 6 is adapted to support a slidable carriage 7 in a manner hereinafter to be described more in detail. This slidable carriage 7 is provided with a rigid supporting base portion 8 on which an adjustable base portion 9 is mounted. This base portion 9 is similar in construction to the adjustable base member 6 previously mentioned. This adjustable base portion 9 can be angularly adjusted with respect to the fixed base portion 8 as desired. The adjustable base portion 9 is adapted to co-operate and support a work-supporting carriage 10 on which are suitably mounted a headstock 11, a tailstock 12, a dividing head 13, and a portion of work to be treated, such as 14, which may be, as shown, a bar of metal on which a desired screw thread is to be produced. This bar can be gripped in a well-known manner between a jaw 15 on the tailstock 12 and by a clutch-dog or jaw 16 on the headstock 11.

Extending outwardly from the upper end of column 1 is an over-arm 17 on which an adjustable tool support 18 is mounted. This over-arm and this tool support are of any desired and well-known type adapted to support a tool such as a rotating cutter 19. The cutter on this support is adapted to be vertically and angularly adjustable in a well-known manner with respect to the workpiece 14. The particular form of tool 19 as shown is a rotating V-disk adapted to cut V bottom screw threads. It is, of course, understood that any other type or shape of tool desired can be used without departing from the spirit of the invention.

The saddle 3 is provided with a vertically projecting bored lug 20 through which a driving screw 5 is adapted to extend. This driving screw receives power at one end, such as 22, from any suitable source. This screw 5 is rigidly journaled in depending ends of the carriage 4 and on one end is provided with a gear 23 adapted to mesh with a gear 24 mounted on a shaft 25 journaled at one end in a bracket 26 on the upper face of the carriage 4 and at the other end, by reason of its projection, through the side of the base member 5′. The base member 5′ is bored out within and in this hollowed-out portion there is mounted a stub shaft 27 on which is rotatably mounted a double bevel gear 28 with the lower gear of which a bevel 29 on the inner end of the shaft 25 is adapted to mesh.

The adjustable base member 6 previously mentioned is provided with oppositely disposed upstanding lug portions 30 and 31 through which projects a screw 32. This screw also passes through a crossbar 33, seen particularly in Figure 3, this crossbar being provided with threaded portions cooperating with the threaded portions of the screw 32. The ends of the screw 32 are journaled in a well-known manner in depending portions of the slide intermediate the carriage 7. The upper gear of the double bevel 28 is adapted to mesh with a bevel gear 34. On the rear face of this bevel gear 34 there is provided clutch fingers such as 35 adapted to engage with similar clutch members on a slidable sleeve 36. This slidable sleeve embraces a hexagon-shaped sleeve 37 which is keyed to the shaft 32. A clutch yoke 38 connected to a suitable lever 39 is adapted to engage and disengage the clutch fingers from each other whereby power can be transmitted between the bevel gear 34 and the bevel gear 28, or disconnected, as desired.

On the outer end of shaft 32 there is provided a gear 40 adapted to mesh with a gear 41 mounted on a shaft 42 journaled in a bracket 43 on the upper face of the intermediate sliding carriage 7. The other end of shaft 42 extends through the side of the fixed base member 8 and carries on its inner end a bevel gear 44 meshing with a double bevel gear 45 which is mounted on a stub-shaft 46 within a hollowed-out portion in the fixed base member 8. The double bevel 45 meshes with a bevel gear 47. This bevel gear 47 is adapted to transmit power to a screw-threaded shaft 48. The transmission of power from the shaft 42 through the bevel gears 44, 45 and 47 and the disconnection of power by means of the actuation of the clutch connected with the bevel gear 47 is brought about in the manner previously described with respect to the interaction of bevel gears 28, 29 and 34. The threaded shaft 48 is journaled at its opposite ends in depending portions of the work-supporting slide or carriage 10. At one end of the threaded shaft 48 a gear 49 is provided meshing with a gear 50. This gear 50 is mounted on a shaft connected with the headstock 11 and through suitable mechanism, which is well-known in machines of this type, is adapted to rotate the work-piece 14. The threaded shaft 48 also extends through forwardly projecting portions 51 and 52 mounted on an adjustable base member 9. A crossbar 53 rigidly connected at each end to the adjustable base member 9 is adapted to receive the threaded shaft 48 but does not co-operate therewith in the same manner as the crossbar 33 co-operating with the threaded shaft 32 previously mentioned. The rotation of the shaft 48 causes the rotation of the work and, at the same time, is adapted under certain conditions to cause the linear movement of the work-supporting carriage 10. In order to cause the linear movement of the work-supporting carriage 10, a handle 54 is moved. This handle is connected to a member 55 of a bell-crank lever pivoted at 56 (see Fig. 3). The other end of this member 55 is connected to a bar 57 one end of which is connected to a latch pin 58 (see Fig. 4). This latch pin is adapted to engage a groove 59 in a sleeve 60. This sleeve 60 is loosely supported on the upwardly projecting lugs 52 and between the same and a clamping collar 61 which is held down on the portion 52 by means of bolts 62. When the latch member or pin 58 engages the groove 59, the sleeve 60 is prevented from having angular movement. By holding this sleeve rigid, therefore, and by reason of the fact that this sleeve is rigidly connected to the adjustable base member 9, the rotatable movement of the threaded shaft 48 within the sleeve 60 will cause the movement of the work-supporting carriage 10 with respect to the adjustable base member 9. The handle 54 above mentioned is also adapted to operate another member 63 of the bell-crank lever, which lever is connected at its outer end to a clutch member 64 attached to engage with the sleeve 60. The movement of the handle 54, which throws the clutch member 64 into engagement with the sleeve 60, disengages the latch bar or pin 58 on the groove 59 so that the clutch member 64 in its rotation can rotate the sleeve 60. The clutch member 64 is keyed to the shaft 48 and, therefore, moves the sleeve 60 at the same angular speed as the shaft 48, whereby the movement of the shaft 48 with the sleeve 60 causes no relative movement between the work-supporting carriage 10 and the adjustable base 9. In this particular position of the handle 54, wherein the sleeve 60 is caused to move with the threaded shaft 48, the carriage 10 does not move linearly but the work-piece 14 merely is rotated.

The clutches described herebefore are adapted to disconnect the power at various stages in the transmission thereof between the source of power and the work-piece so that adjustments can be made and the various slides can be set in the desired positions.

In accordance with the diagram shown in Fig. 8, the vector $v_1$ represents graphically the movement of the lower sliding carriage 4. The vector $v_2$ represents the movement of the intermediate sliding carriage 7, and the vector V represents the resultant movement of the work-supporting carriage 10. The manner of adjusting the adjustable base members 6 and 9 on the fixed or rigid base members 5' and 8 is as follows: The under surface of the adjustable members 9 and 6 are provided with a T shaped annular groove into which the heads of suitable bolts, such as 65, seen in Figure 2, are inserted. Each of these fixed members 5' and 8 are provided at one portion in their periphery with a recess 66 in which a nut 67 connected to the lower end of the bolt 65 is seated. By loosening the nut from the bolt, the adjustable members 6 and 9 can be angularly placed in any related positions with respect to their fixed base portion in accordance with graduations placed on the abutting edges of the adjustable and fixed base members. These graduations are not shown in the drawings but are of any well-known type whereby the seating may be made to within any desired degree. Tightening the nuts 67 will fix the position of the adjustable base members on the fixed base members.

The lower carriage or slidable table 4 has a movement back and forth in one direction, represented by the vector $v_1$. The intermediate adjustable, sliding carriage 7, however, can be adjusted at any angle with respect to the carriage 4. The movement of this carriage is represented by the vector $v_2$. The resultant of the two vectors $v_1$ and $v_2$ is the vector V.

An example of the way in which the device or attachment is operated to cut a thread is hereinafter given. Assuming that it is desired to cut a thread on the work-piece 14 having a pitch of eight threads per inch, and assuming that the threaded shafts 5 and 32 are revolved at 50 revolutions per minute and that the work-piece is revolved at the rate of 40 revolutions per minute; it is desired to calculate in advance the proper angles at which to set the adjustable sliding carriage 7 with respect to the carriage 4 and the angle at which to set the work-supporting carriage 10 with respect to the carriages 4 and 7. If the work is revolved at 40 revolutions per minute, it must travel five inches in a minute in order to cut a thread of a pitch having eight threads per inch. Since each revolution means one thread, and there are eight threads per inch, there would be forty threads in five inches or forty revolutions in five inches, equivalent to 40 revolutions per minute. Since the work-carriage 10 must move five inches past the cutter 19, it is to be observed, therefore, that the carriages 7 and 4 must also travel five inches in the same time.

In accordance with the well-known cosine formula $$V^2 = v_1^2 + v_2^2 + 2v_1 v_2 \cos. \Theta.$$

In this formula large V represents the resultant motion of the work-supporting carriage 10; $v_1$ represents the motion of the carriage 4; $v_2$, the motion of the carriage 7; and cosine $\Theta$ represents the angle between the vector $v_1$ and $v_2$ as shown in Figure 8. Substituting the value five for the large and small $v$'s in this formula, we get a value for the cosine $\Theta$ of $-.5$, which in this case represents an angle of 120°. The first step, therefore, is to move the carriage 4 to one extreme position. Since in the problem, as shown in Figures 7 and 8, it is to move to the left, the carriage must be moved by the power to the extreme right-hand position so that full advantage may be obtained of its entire length of travel. The intermediate carriage 7 is to be moved into its extreme backward position and set at an angle of 120° with respect to the carriage 4. Since the vector V is the resultant of the other two vectors, and, in accordance with the well-known laws of graphics, the resultant V will assume an angle with respect to either of the other two vectors equal to half the angle between these vectors when the vectors are equal, namely, 60°; therefore, the work-supporting carriage 10 is moved to its extreme backward position and adjusted at an angle of 60°, half the value of the angle between the lower and intermediate sliding carriages 4 and 7, respectively. It is to be borne in mind, of course, that after having once been set the work-supporting carriage 10 does not move relative to the intermediate carriage 7 but is carried thereby. The cutting tool or disk 19 is disposed with respect to the beginning of the work-piece, as shown in Figure 7, at an angle corresponding to the pitch of the thread desired. This tool, of course, is stationary, but since it is a disk, it is obvious that it must be angularly related to the work-piece as it rotates in accordance with the pitch desired.

Power is then applied to the machine, upon the application of which the lower carriage 4 commences to move in the direction of $v_1$, at the same time it drives the intermediate carriage 7 through the gearing above mentioned in the direction $v_2$. This intermediate carriage carries the work-supporting carriage 10 and the work-piece 14, which are disposed in a line with the resultant motion of the work-piece shown graphically in Figure 8. It is apparent, therefore, that by adjusting the carriage 7 with respect to the carriage 4 and suitably positioning the work-supporting carriage 10 with respect to the other two carriages, threads, spiral grooves, and other uniform grooves can be produced on a work-piece and that the range of pitch of these threads or grooves is not limited except as the position of the parts of the machine is limited due to the space at hand or available. It is equally obvious that in order to produce these grooves of various pitch, a simple setting of the various carriages only is required and that the usual and well-known necessity for changing gears and having special gears always at hand is entirely eliminated. This eliminates the consumption of time, money and labor which usually occurs in machine shops where threads of gears are cut.

It is also to be observed that the carriages 7 and 10 and their co-operating base members are provided in the form of attachments which can be bolted on to the ordinary feed carriage or table 4 and connected to each other. If the milling machine is to be used as an ordinary miller, the base members 5' and 6, the carriage 7, the base members 8 and 9, and the work support 10, can be taken off the machine and the headstock 11 and the tailstock 12 placed on the lower carriage 4 in the usual manner. This attachment provides a structure which eliminates the necessity for altering milling machines of known types excepting to a very minor extent, whereby machines of well-known types can be made use of with little expense. It is equally apparent that with minor adjustments in the parts, which are well within the spirit of the invention, other grooves, such as flat, spiral, or helical grooves on flat surfaces, which may be rotated in any suitable manner on the work carriage 10, may be produced; and other grooves which may be produced by the combination and application of the vectors and in the manner above described.

What I claim is:

1. A machine having a tool thereon and a base portion, which comprises a work support having a work-piece thereon, means for feeding the support relative to the tool and at a predetermined speed, means operated by said feeding means to rotate the work-piece at a speed bearing a certain ratio to the feed of the support, and means for varying the feed of the support relative to the tool independently of the speed of the feeding means.

2. A metal-working machine having a tool thereon, a feed table, means for moving said feed table at a predetermined speed relative to said tool, a work-supporting carriage mounted on said feed table, means for adjusting the position of the work-supporting carriage angularly relative to the feed table, and means for driving the work-supporting carriage at a predetermined speed bearing a definite ratio to the speed of the feed table, said driving means operating independently of the position of the work-supporting carriage with respect to the feed table.

3. A milling machine having a tool thereon, which comprises a feed table, a work-supporting table, a sliding table intermediate the work-supporting table and the feed table, means for adjusting these tables with respect to each other in a predetermined relatively angular position, and means for moving the tables at a predetermined linear speed with respect to each other independent of their angular adjusted position.

4. A milling machine having a tool thereon, which comprises a feeding table, a second table disposed on the feed table, a work-supporting table disposed on said second table and having a work-piece mounted thereon, means for adjusting the second table angularly with respect to the feed table, means for adjusting the work-supporting table with respect to the second table, and means for driving the feed table and the second table at a predetermined speed independently of their relative position, said driving means also adapted to rotate the work-piece at a definite relative speed.

5. A milling machine having a tool and a base, a work support having a work-piece thereon adapted to be disposed in proximity to said tool, a plurality of relatively adjustable tables disposed between said work support and said base, means for driving said work support and said work-piece relative to said tool at a predetermined speed, and means for varying the linear speed of the work-piece relative to the tool by the setting of the tables angularly with respect to each other independently of the rate of motion of the driving means.

CHARLES KUSOLD.